United States Patent
Beckett et al.

(10) Patent No.: US 6,827,446 B2
(45) Date of Patent: Dec. 7, 2004

(54) STEREOSCOPIC VISUALIZATION DISPLAY APPARATUS

(75) Inventors: Peter Beckett, Poulton (GB); Peter C Wright, Preson (GB); Ian Bickerstaff, St. Helens (GB)

(73) Assignee: BAE Systems plc, Farnborough (GB)

( * ) Notice: Subject to any disclaimer, the term of this patent is extended or adjusted under 35 U.S.C. 154(b) by 0 days.

(21) Appl. No.: 10/343,053

(22) PCT Filed: Jul. 25, 2001

(86) PCT No.: PCT/GB01/03345

§ 371 (c)(1),
(2), (4) Date: Jan. 28, 2003

(87) PCT Pub. No.: WO02/12957

PCT Pub. Date: Feb. 14, 2002

(65) Prior Publication Data

US 2003/0117586 A1 Jun. 26, 2003

(30) Foreign Application Priority Data

Aug. 8, 2000 (GB) .............................. 0019349

(51) Int. Cl.⁷ ........................ G03B 21/00; G03B 21/26; G03B 21/30
(52) U.S. Cl. ............... 353/7; 353/28; 353/37; 353/72; 353/122
(58) Field of Search .................. 353/7, 8, 12, 28, 353/37, 73, 122, 15–19, 74–80, 119, 11, 50, 98, 77; 359/462, 464, 475–479

(56) References Cited

U.S. PATENT DOCUMENTS

| | | | | |
|---|---|---|---|---|
| 4,408,850 A | * | 10/1983 | Norek | 353/122 |
| 5,868,484 A | * | 2/1999 | Chikauchi et al. | 353/119 |
| 5,890,787 A | * | 4/1999 | McNelley et al. | 353/28 |
| 5,954,517 A | * | 9/1999 | Hagenlocher | 434/365 |
| 5,961,195 A | * | 10/1999 | Yoshimatsu et al. | 353/98 |
| 6,211,903 B1 | * | 4/2001 | Bullister | 348/14.16 |
| 6,334,687 B1 | * | 1/2002 | Chino et al. | 353/79 |
| 6,431,711 B1 | * | 8/2002 | Pinhanez | 353/69 |
| 6,554,431 B1 | * | 4/2003 | Binsted et al. | 353/28 |
| 6,554,434 B2 | * | 4/2003 | Sciammarella et al. | 353/98 |

FOREIGN PATENT DOCUMENTS

| | | |
|---|---|---|
| CH | 616 004 | 2/1980 |
| EP | 0 111 915 | 6/1984 |
| GB | 0973099 | 10/1964 |
| GB | 1 574 839 | 9/1980 |

OTHER PUBLICATIONS

Underkoffler et al. (John Underkoffler, Brygg Ullmer, Hiroshi Ishii), Emancipated pixels: real-world graphics in the luminous room, Jul. 1999, Proceedings of the 26$^{th}$ annual conference on Computer graphics and interactive techniques, (ACM), 385–392.*

Froehlich B et al: "The Responsive Workbench: A Virtual Working Environment for Physicians" Computers in Biology and Medicine, New York, NY, US, vol. 25, No. 2, Mar. 1995 pp. 301–308, XP000989779, ISSN: 0010–4825 abstract, sections 3. "System Description" and 6. "Summary".

* cited by examiner

Primary Examiner—David Gray
Assistant Examiner—Andrew Sever
(74) Attorney, Agent, or Firm—Nixon & Vanderhye P.C.

(57) ABSTRACT

Stereoscopic visualization display apparatus comprising a table (6) having a top (12) onto which a stereoscopic image is projected, a stereoscopic projector (2) closely adjacent to the table (6) and oriented so as to project an image away from the table (6) and towards a reflector (8) so positioned as to reflect the image from the projector (2) onto the table top (12).

5 Claims, 1 Drawing Sheet

STEREOSCOPIC VISUALIZATION DISPLAY APPARATUS

This application is the U.S. national phase of international application PCT/GB01/03345, filed in English on 25 Jul. 2001 which designated the U.S. PCT/GB01/03345 claims priority to GB Application No. 0019349.0. The entire contents of these applications are incorporated herein by reference.

FIELD OF THE INVENTION

This invention relates to display apparatus, in particular to stereoscopic visualisation display apparatus of the type in which a stereoscopic image is projected onto a viewing screen and is viewable in stereoscope by an observer wearing special glasses.

BACKGROUND OF THE INVENTION

Such Stereoscopic, or "3D", display apparatus is well known in the automotive and architecture fields, and has been used in the aerospace and defence industries. In many applications, stereoscopic projection onto a vertical or wall-mounted screen is common, however for certain applications a more immediate intuitive assimilation of the information contained in the projected image can be achieved when the image is projected onto a table top (i.e. onto a screen which is horizontal, or only slightly inclined thereto).

Such table top displays require substantial headroom above the table in which to mount the projector, and are usually clumsy to install and not readily transportable. Attempts have been made to address these problems using "back projection" arrangements, in which the projector is mounted beneath the table top, which is formed of translucent or semi-transparent material so that the image projected onto the bottom of the table top can be viewed from above. The disadvantage of such systems is that there is only a short "throw" (the distance between the projector and screen), leading to limited spread of image without the use of powerful projection lenses, and also that the intensity of the projected image is considerably attenuated in its passage through the table top "screen".

SUMMARY OF THE INVENTION

In order to address these concerns, the present invention provides a stereoscopic visualisation display apparatus comprising a table having a top onto which a stereoscopic image is projected, a stereoscopic projector closely adjacent to the table and oriented so as to project an image away from the table and towards a reflector so positioned as to reflect the image from the projector towards and onto the table top.

Such an arrangement effectively doubles the projector "throw", enabling a relatively compact arrangement whilst allowing the image to spread, it also has the advantage that the projector does not need to be supported above the table top, only a relatively light weight reflector. Moreover, although the reflector does result in some attenuation in image intensity this is not so great as in a "back projection" system. Thus, an apparatus in accordance with the invention is capable of producing a high quality image and can be made so as to be easily transportable.

The projector is preferably releasably mounted to the table, and may be releasably received within a collapsible cradle which is fitted to the table and unfolds into position from beneath the table top. The cradle may be designed to unfold into a position such that, when the projector is held thereon, the projector is aligned so as to project an image in a given direction above and away from the table top so as to facilitate the location and orientation of the reflector.

Additionally or alternatively a frame is provided, which may be collapsible and/or integral with the table, which is adapted to hold the reflector generally above the table top. Such an arrangement enables the apparatus to be erected easily and quickly, and the reflector may be mounted to the frame in such a way as to be tiltable about at least one, preferably substantially horizontal axis, and/or movable to a limited degree, in order accurately to align the reflected image onto the table top.

The reflector is preferably a lightweight mirror, and of the type comprising a silvered reflecting surface deposited on a flat plastics substrate. Provision of the reflecting surface on top of the substrate minimises attenuation of the image intensity during reflection, and the use of a lightweight substrate facilitates the support and accurate alignment of the reflector relative to the projector and the table top.

BRIEF DESCRIPTION OF THE DRAWINGS

The invention will now be described by way of example and with reference to the accompanying drawings, in which.

PREFERRED EMBODIMENT OF THE INVENTION

Figure 1:
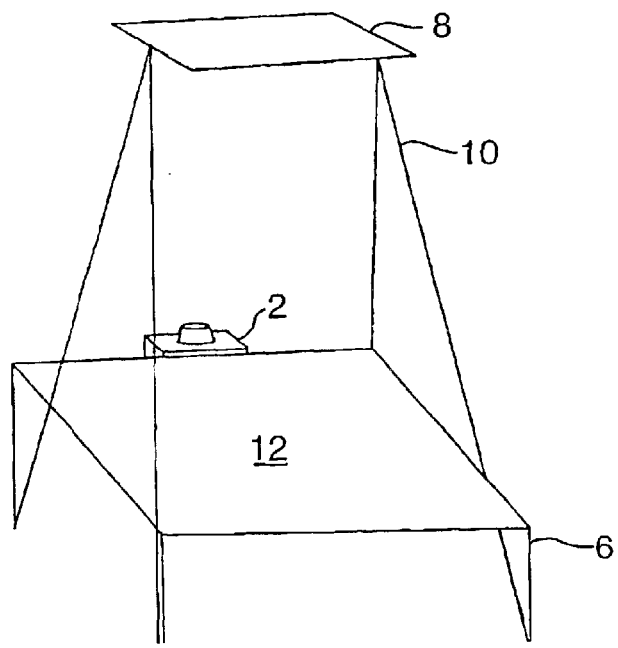
FIG. 1 is a schematic isometric view of an apparatus in accordance with the invention.
Figure 2:
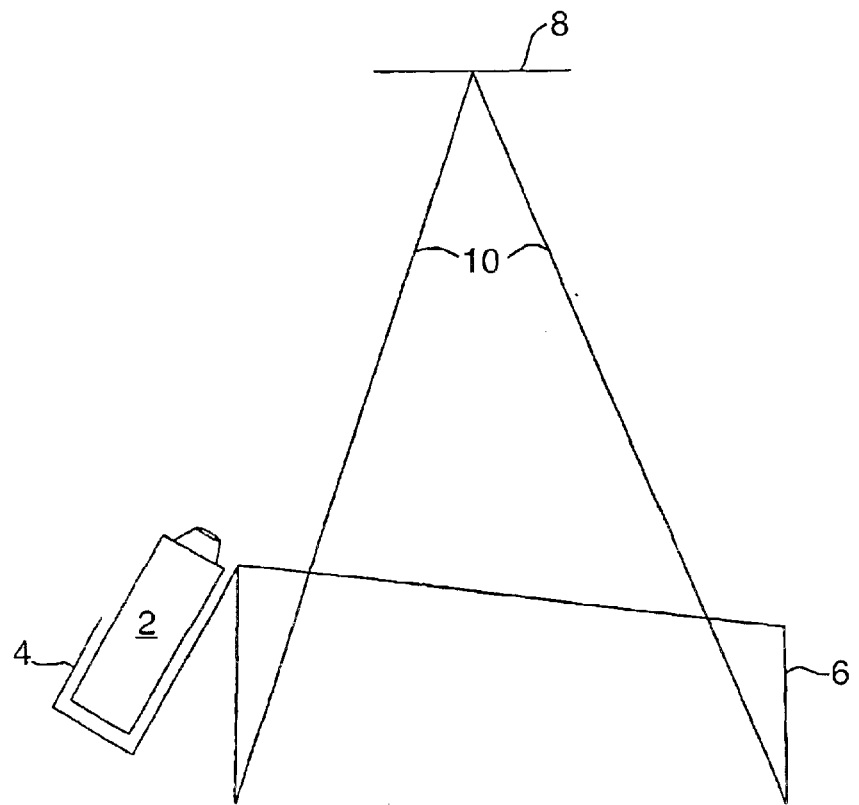
FIG. 2 is a schematic side elevation view of the apparatus of FIG. 1.

Referring to both Figures, a stereoscopic projector 2 is releasably held in a cradle 4, which in turn is mounted to table 6. Above table 6 is a mirror 8 supported by frame 10, and the alignment of table 6, cradle 4, projector 2 and mirror 8 is such that an image projected by projector 2 is reflected back down onto the reflective top 12 of table 6 and is centred relative thereto.

The table top 12 is tilted slightly to the horizontal to improve the view to an observer having a viewpoint similar to that for FIG. 1, and it will be understood that the amount of tilt could be variable if desired. The cradle 4 is collapsible, and conveniently forms part of the table 6 structure, so that the apparatus is easily folded down for transporting. Similarly, the frame 10 is collapsible, and holds the mirror 8 such that it is pivotable in order to align the image on the table top 6, thus creating a simple and transportable stereoscopic visualisation display unit.

What is claimed is:

1. Stereoscopic visualisation display apparatus comprising a table having a top onto which a stereoscopic image is projected, a stereoscopic projector closely adjacent to the table and oriented so as to project an image away from the table and towards a reflector so positioned as to reflect the image from the projector towards and onto the table top, wherein the projector is releasably received within a collapsible cradle fitted to the table and adapted to unfold from a position beneath the table top.

2. Stereoscopic visualisation display apparatus according to claim 1, said apparatus comprising a collapsible frame adapted to hold the reflector generally above the table top.

3. Apparatus according to claim 2 wherein the frame is adapted to permit the tilting of the reflector about a substantially horizontal axis.

4. Apparatus according to claim 1 wherein the reflector is a lightweight mirror of the type comprising a silvered, reflecting surface deposited on a flat plastics substrate.

5. Apparatus according to claim 1 wherein the table is adapted such that the table top is tiltable towards a viewer.

* * * * *